United States Patent
Sugita et al.

(10) Patent No.: US 6,453,118 B2
(45) Date of Patent: *Sep. 17, 2002

(54) INFORMATION TRANSMISSION METHOD, INFORMATION DUPLICATION PROHIBITING METHOD, INFORMATION DUPLICATION PROHIBITION DEVICE AND INFORMATION CREVORDING MEDIUM

(75) Inventors: Takehiro Sugita, Kanagawa; Akira Ogino, Chiba; Takashi Usui, Tokyo, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/968,118

(22) Filed: Nov. 12, 1997

(30) Foreign Application Priority Data

Nov. 19, 1996 (JP) ............................................. 8-323486

(51) Int. Cl.[7] ................................................. H04N 5/91
(52) U.S. Cl. .............................. 386/94; 386/95; 380/201
(58) Field of Search ............................... 386/46, 94, 95, 386/84; 380/4, 5, 268, 222, 201; 375/141; 360/5, 27; 348/468; H04R 5/76, 5/91

(56) References Cited

U.S. PATENT DOCUMENTS

| | | | | |
|---|---|---|---|---|
| 3,984,624 A | | 10/1976 | Waggener | .................... 348/473 |
| 4,527,195 A | * | 7/1985 | Cheung | ..................... 380/222 |
| 4,796,255 A | | 1/1989 | Westbrook et al. | ......... 370/294 |
| 4,841,521 A | | 6/1989 | Amada et al. | ............... 370/296 |
| 5,251,041 A | * | 10/1993 | Young et al. | .................. 386/94 |
| 5,303,294 A | * | 4/1994 | Kimoto et al. | ................ 386/94 |
| 5,418,853 A | * | 5/1995 | Kanota et al. | ................ 386/94 |
| 5,523,853 A | * | 6/1996 | Yamashita et al. | ............ 386/94 |
| 5,627,655 A | * | 5/1997 | Okamoto et al. | ............. 386/94 |
| 5,687,191 A | * | 11/1997 | Lee et al. | .................... 375/216 |
| 5,719,937 A | * | 2/1998 | Warren et al. | ................. 386/94 |
| 5,778,064 A | * | 7/1998 | Kori et al. | ..................... 386/94 |
| 5,822,425 A | * | 10/1998 | Ezaki et al. | ................... 386/94 |
| 5,907,656 A | * | 5/1999 | Orguro | ......................... 386/94 |
| 5,937,000 A | * | 8/1999 | Lee et al. | .................... 375/141 |

FOREIGN PATENT DOCUMENTS

| | | |
|---|---|---|
| AT | A 1087/95 | 7/1995 |
| DE | 3632710 A | 3/1988 |
| EP | 0360615 | 3/1990 |
| EP | 0 426 961 | 8/1990 |
| EP | 0400906 | 12/1990 |
| EP | 0574892 | 12/1993 |
| GB | 2 145 609 A | 8/1924 |

OTHER PUBLICATIONS

1994 IEEE Singapore International Conference on Communication Systems, ISBN 0–7803–2046–8, pp. 571–575, vol. 2.

1994 IEEE Transaction On Vehicular Technology, vol. 43, No. 4, Wai–Choong, Wong et al., Shared Time Division Duplexing: An Approach To Low–Delay High Quality Wireles Digital Speech Communications, pp. 935–936.

1981 IEEE Transactions On Communications, vol.; Com–29, No. 11, Nobuo Inoue et al., Time–Shared Two–Wire Digital Subscriber Transmission System and Its Application to the Digital Telephone Set, pp. 1565–1572.

\* cited by examiner

*Primary Examiner*—Huy T Nguyen
(74) *Attorney, Agent, or Firm*—Jay H. Maioli

(57) ABSTRACT

The level of the spectrally spread anti-duplication control signal to be superimposed on an information signal such as a video signal is changed by using a random number RD generated by a random number generation unit 163. Since it is difficult to follow after the change of the level of the spectrally spread anti-duplication control signal, elimination of the anti-duplication control signal from the information signal is made further difficult. This can reliably provide the anti-duplication control signal to the receiving side.

14 Claims, 11 Drawing Sheets

INFORMATION TRANSMISSION METHOD, INFORMATION DUPLICATION PROHIBITING METHOD, INFORMATION DUPLICATION PROHIBITION DEVICE AND INFORMATION CREVORDING MEDIUM

BACKGROUND OF THE INVENTION

1. Field of the Invention

This invention relates to an information transmission method capable of reproducing an information signal recorded on a recorded medium, transmitting the same together with duplication prohibiting information, receiving the transmitted information signal and limiting or prohibiting the information signal from being recorded on another recording medium, as well as an information duplication prohibiting method, an information duplication prohibiting device and an information recording medium.

2. Related Art Statement

VTRs (Video Tape Recorders) have been popularized and many softwares which can be played back on VTRs have been provided. Further, playback devices such as digital VTR or DVD (Digital Video Disc) have been put to practical use recently and high quality video images or sounds can be easily enjoyed by playing back them.

There is, however, a problem that such softwares provided in abundance are duplicated without authorization and several methods have been utilized for prohibiting such duplication.

For example, in a case of using VTRs for outputting analog video signals, there is an anti-duplication method of utilizing a difference of the AGC (Automatic Gain Control) system or a difference of the characteristics of the APC (Automatic Phase Control) between a VTR as the recording device and a monitor receiver for providing video images.

In a case of utilizing the difference of the AGC system, for example, when the VTR adopts AGC that use a pseudo sync signal inserted in the video signal while the monitor receiver adopts an AGC systems that does not use such a pseudo sync signal, a pseudo sync signal at an extremely high level is inserted into the video signal supplied from the play back VTR to the recording VTR upon outputting the same.

Further, in a case of utilizing the difference of APC characteristic, when the VTR adopts APC that use to the phase of the color burst signal in the video signal, while the monitor receiver adopts an APC system different therefrom, the phase of the color burst signal in the video signal supplied from the playback VTR to the recording VTR is partially inverted.

Thus, the monitor receiver receiving the analog video signal supplied from the playback VTR can normally playback the video image free from the effect of the pseudo sync signal or the partial inversion of the phase for the color burst signal used for the APC.

Then, the VTR that receives the analog video signal inserted with the pseudo sync signal or undergoing the phase inversion control of the color burst signal as described above and records the signal on the recording medium can not conduct normal gain control or phase control based on the input signal and can not normally record the video signal. Accordingly, even if the recorded video signal is played back, normal video image capable of being viewed can not be played back.

Further, a digital VTR or the like used for digitized video signals conducts anti-duplication control such as prohibition of duplication by adding an anti-duplication control signal comprising, for example, an anti-duplication control code or a duplication ranking controlling code to the video signal as data and recording the same on the recording medium.

In this case, the digital VTR as the play back device reads out the video signal, audio signal and anti-duplication control signal recorded on the recording medium and supplies them as a digital or analog play back signal to the digital VTR as the recording device.

The digital VTR as the recording device extracts the anti-duplication control signal from the supplied playback signal, and controls recording the supplied play back signal to the recording medium based on the anti-duplication control signal. For example, if the anti-duplication control signal contains a duplication prohibition code, the digital VTR as the recording device conducts control so as not to conduct recording.

Further, if the anti-duplication control signal contains a duplication ranking control code, recording is controlled in accordance with the ranking control code. For example, if the ranking control code is information for permitting copying only once, the digital VTR as the recording device adds a duplication prohibition code and records the video signal and the audio signal as the digital data in recording medium. Accordingly, the video signal can not be duplicated by using such a duplicated recording medium.

In the so-called digital connection of supplying the video signal, audio signal and anti-duplication control signal as digital signals to the digital VTR as the recording device, when the anti-duplication control signal in the form of digital data is supplied to the digital VTR as the recording device, anti-duplication control can be conducted using the anti-duplication control signal on the side of the recording device.

However, in the analog connection of supplying the video signal and audio signal as analog signals to the digital VTR as the recording device (A/D conversion being conducted by digital VTR), since the anti-duplication control signal is not superimposed on the analog information signal such as the video signal or audio signal, when the signals supplied to the recording device is put to D/A conversion, the anti-duplication control signal is depleted.

Therefore, in the case of the analog connection, an anti-duplication control signal has to be added to the D/A converted video signal or audio signal, which deteriorates the video signal or audio signal.

That is, it is difficult to add the anti-duplication control signal and take out the same in the recording device for use in anti-duplication control, without deteriorating the D/A converted video signal or audio signal.

In view of the above, anti-duplication has been conducted so far in the case of the analog connection by adopting the anti-duplication control method utilizing the difference of the AGC system or the difference of the APC characteristics between the VTR and the monitor receiver as described previously.

However, the duplication prohibition method by utilizing the difference of the AGC system or the difference of the APC characteristics between the VPR and the monitor receiver involve the problem that the video signal is recorded normally and anti-duplication can not be attained or the played back image on the monitor receiver is disturbed depending on the AGC system or the APC characteristics on the side of the-recording device. Further, it is troublesome to adopt anti-duplication methods between the analog connection and the digital connection as described above.

As of an anti-duplication method which is effective in both the analog connection and the digital connection and does not deteriorate the played back video image or sound, a method of spectrally spreading the anti-duplication control signal and superimposing the same on the video signal has been considered.

In this system, a PN (Pseudo Random Noise) series code (hereinafter referred to as PN code) used as the spreading code is generated at a sufficiently rapid period, which is multiplied by anti-duplication control signal, thereby converting the duplicate control signal which is spectrally spread and has narrow band and high level into a wide band low level signal giving no undesired effect on the video signal or the audio signal. Then, the spectrally spread anti-duplication control signal is superimposed on the analog video signal and then recorded in the recording medium. In this case, the signal to be recorded on the recording medium may be either a analog signal or a digital signal.

Not in a case of a recording medium in which the spectrally spread anti-duplication control signal is superimposed on the video signal but in a case of a recording medium in which the anti-duplication control signal is recorded together with the video signal by another method, the anti-duplicate control signal is extracted from the played back signal in the play back device, applied with a PN code to spectrally spread, and superimposed on the outputted video signal.

On the other hand, the recording device conducts inverse spectral spread to the video image inputted therein by applying phase control so as to generate a PN code which is identical in the generation timing and the phase with those the PN code used for the spectral spread of the anti-duplication control signal, and multiplying the PN code with the video signal superimposed with the spectrally spread anti-duplication control signal, thereby taking out the original anti-duplication control signal. Then, the duplication control is conducted based on the anti-duplication control signal taken out by the inverse spectral spread.

As described above, since the anti-duplication control signal is spectrally spread and superimposed as a wide band and low level signal on the video signal, it is difficult for those who are unauthorized to conduct duplication to eliminate the superimposed anti-duplication control signal from the video signal.

However, the anti-duplication control signal superimposed by the inverse spectral spread can be detected and utilized. Accordingly, the anti-duplication control signal can be provided together with the video signal reliably to the recording device, and the recording device can detect the anti-duplication control signal and conduct duplication control reliably in accordance with the detected anti-duplication control signal.

By the way, it is theoretically possible, although difficult, to eliminate the anti-duplication control signal spectrally spread and superimposed on the video signal from the video signal as described above.

For instance, if the spectrally spread anti-duplication control signal is at a constant level, after the video signal is received and before the video signal is supplied to the recording device, the spectrally spread anti-duplication control signal superimposed on the video signal is detected, for example, by using a sliding correlator. Then, an offset signal at the same level and the same phase as those of the spectrally spread anti-duplication control signal superimposed on the video signal is generated based on the detected anti-duplication control signal, and the generated signal is subtracted from the video signal superimposed with the spectrally spread anti-duplication control signal, thereby enabling the anti-duplication control signal which is spectrally spread and superimposed on the video signal to be eliminated.

Then, if the anti-duplication control signal superimposed on the video signal is eliminated, duplication of the video image which is prohibited is possible and it may be that unauthorized duplication of the video image can be conducted.

SUMMARY OF THE INVENTION

In view of the foregoings, it is an object of this invention to make an anti-duplication control signal more difficult to be eliminated in a case of transmitting a spectrally spread anti-duplication control signal that superimposed on the information signal, without deteriorating the information signal.

The foregoing object can be attained in accordance with this invention by the information transmission method comprising;

modulating an anti-duplication control signal for prohibiting or permitting duplication of information signal on a recording medium, into a spectrally spread signal that has a changing at the level and superimposing the modulated anti-duplication control signal on the information signal and transmitting the same.

Further, in the preferred embodiment for the transmission method described above wherein the information signal is a video signal and a spreading code used for spectral spread of the anti-duplication control signal is generated in synchronization with the video synchronization signal in the video signal.

According to the information transmission method of this invention as described above, the anti-duplication control signal is modulated into a spectrally spread signal that has a changing level, and transmitted while being superimposed on the information signal.

In this case, the level of the spectrally spread anti-duplication control signal is changed at random, for example, by using an optional random number. Accordingly, unless the random number used for the level change is known, it can not be recognized how the level of the anti-duplication control signal is changed.

Accordingly, even if it is intended to eliminate from the information signal the anti-duplication control signal superimposed on the information signal, it is not possible to form a signal for offsetting the spectrally spread anti-duplication control signal that is changing at the level and it is further difficult to eliminate the anti-duplication control signal superimposed on the information signal.

On the other hand, the inverse spectral spread treatment can be conducted with no significant effect by the level change of the anti-duplication control signal and without using the random number used for changing the level.

Accordingly, the anti-duplication control signal superimposed on the information signal is not eliminated and the anti-duplication control signal superimposed on the information signal can be extract for conducting anti-duplication control in accordance with the anti-duplication control signal.

Further, in the preferred embodiment for the information transmission method of this invention described above, if the information signal is a video signal, the spread code used for spectral spread is generated, for example, in synchronization with a vertical sync signal which is a video sync signal in the video signal.

Thus, also in the receiving side of the video signal as the information signal, a spreading code for inverse spread can be generated at the same timing as that of the spreading code used for spread.

Accordingly, the code used for spread spectrally spreading the anti-duplication control signal superimposed on the video signal as the information signal can be rapidly synchronized with the spreading code for inverse spread, and the anti-duplication control signal superimposed on the video signal can be detected rapidly and exactly.

BRIEF DESCRIPTION OF THE ACCOMPANYING DRAWINGS

DESCRIPTION OF THE PREFERRED EMBODIMENT

Description will be made to the information transmission method, information duplication prohibiting method, information duplication prohibiting device, and information recording medium according to this invention, each for their preferred embodiments with reference to the drawings.

A system for prohibiting information duplication constituted with an information output device and an information recording device to be explained below is applied with the information duplication prohibiting method according to this invention. In the preferred embodiment to be explained below, both the information output device (hereinafter simply referred to as an output device) and the information recording device (hereinafter simply referred to as a recording device) are applied to a recording/playback device of DVD (Digital Video Disc) (hereinafter simply referred to as DVD device). For the sake of the simplicity of the explanation, description for the audio signal system will be omitted.

[First Embodiment]

Figure 1:
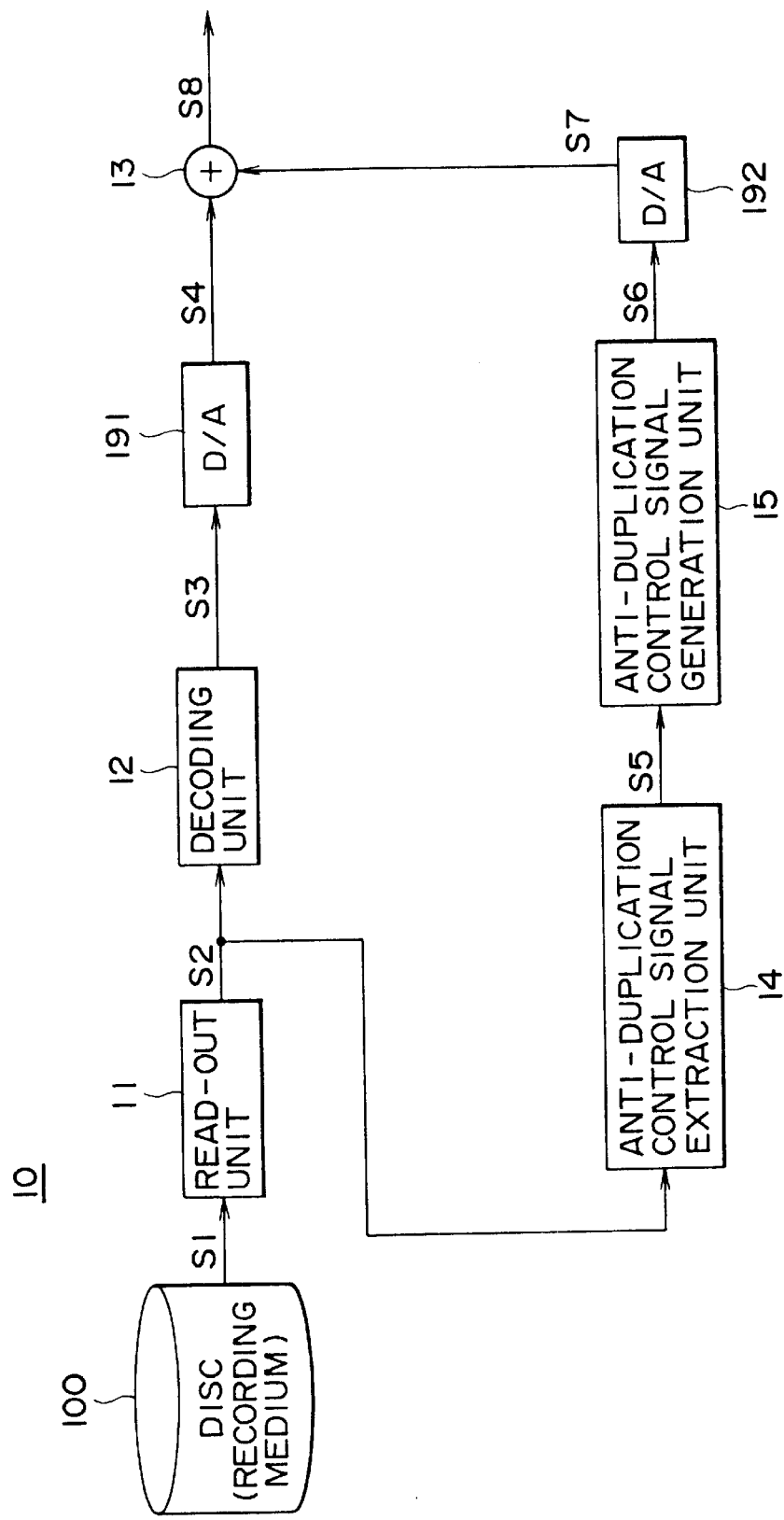
FIG. 1 is a block diagram for explaining an embodiment of an input device as an information anti-duplication control device according to this invention.

FIG. 1 is a view for explaining an output device 10 in the first embodiment. The output device 10 corresponds to a playback system of a DVD device in this first embodiment.

In FIG. 1, a disc medium 100 is a medium on which digitized video and audio signals are recorded together with an anti-duplication control signal as additional information. In this case, the medium 100 is a DVD. The anti-duplication control signal may be recorded on the innermost or outermost TOC (table of contents) or a track area known as the directory, or it may be inserted as a separate recording area on a track in which video data or audio data is recorded. The example described below is for the latter case, in which the anti-duplication control signal is read out at the same time as the video signal is read out.

The anti-duplication control signal in this embodiment is information for prohibiting or permitting duplication, or indicating the limit or ranking thereof, and it is added to the video signal. The disc medium 100 is placed in to the output device 10, and a recorded signal is read out.

As shown in FIG. 1, the output device 10 comprises a read-out unit 11, decoding unit 12, addition unit 13, anti-duplication control signal extraction unit 14, ss (ss: abbreviation, here and hereinafter, of Spectral Spread) anti-duplication control signal generation unit 15, and D/A conversion circuits 191, 192.

The read-out unit 11 take outs a digital playback video signal component S2 from the signal S1 obtained by playing back the information recorded on the disc medium 100, and supplies this to the decoding unit 12 and the anti-duplication control signal extraction unit 14.

The decoding unit 12 performs decoding on the digital video signal component S2, generates a digital playback video signal including vertical sync signal and horizontal sync signal, and supplies this to the D/A conversion circuit 191. The D/A conversion circuit 191 conducts D/A conversion of the digital video signal S3 to generate an analog video signal S4. The analog video signal S4 formed therein is supplied to addition unit 13.

The anti-duplication control signal extraction unit 14 extracts an anti-duplication control signal S5 from the information data sequence of the playback video signal component S2 taken out by the read-out unit 11, and supplies this to the SS anti-duplication control signal generation unit 15.

The SS anti-duplication control signal generation unit 15 generates a PN code sequence of a predetermined code pattern from the top end thereof based on a clock signal synchronized with the digital video signal each time reset signal RE is supplied and spectrally spreading the anti-duplication control signal by using the PN code sequence.

Figure 2:
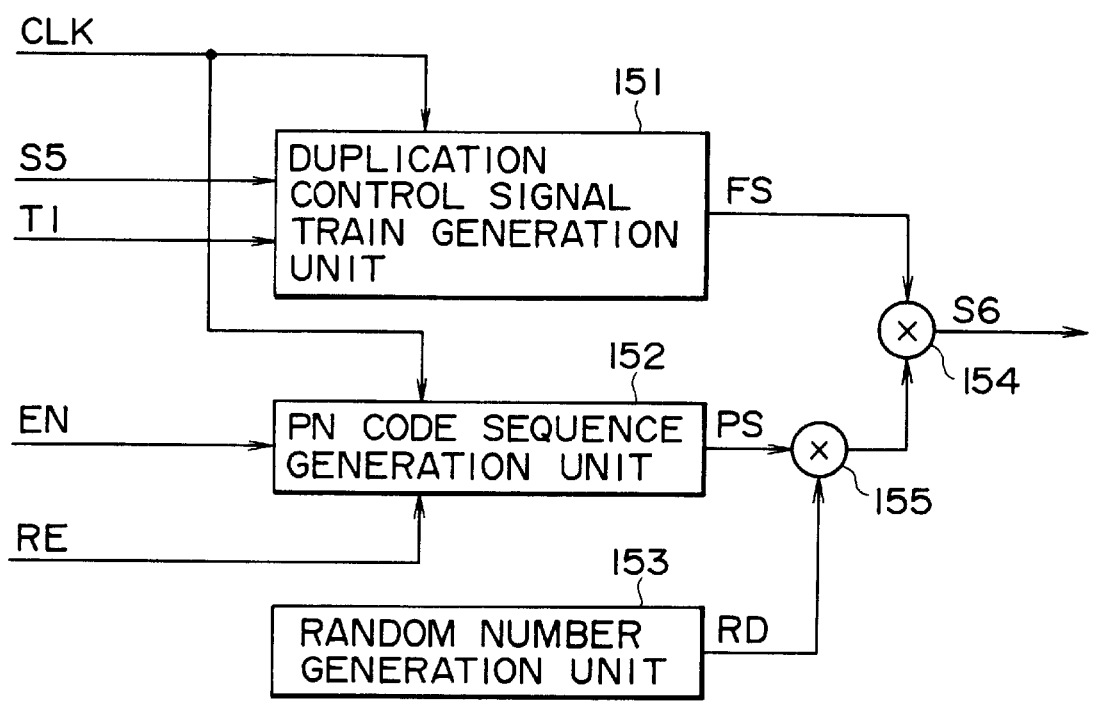
FIG. 2 is a block diagram for explaining Spectral Spread (SS) anti-duplication control signal generation unit shown in FIG. 1.

FIG. 2 is a view for explaining the SS anti-duplication control signal generation unit 15 in this embodiment. As shown in FIG. 2, the SS anti-duplication control signal generation unit 15 comprises an anti-duplication control signal sequence generation unit 151, a PN code sequence generation unit 152, a random number generation unit 153 and multiplication units 154, 155.

As shown in FIG. 2, the anti-duplication control signal sequence generation unit 151 is supplied with clock signal CLK, anti-duplication control signal S5 and timing signal T1. In this case, the timing signal T1 represents, for example, a divisional timing on every 1 bit of anti-duplication control signal S5. Then, the anti-duplication control signal sequence generation unit 151 outputs the anti-duplication control signal S5 by the number of clocks on every 1 bit, thereby generating the anti-duplication control signal sequence FS, which is supplied to the multiplication unit 154.

The PN code sequence generation unit 152 is supplied with clock signal CLK, enable signal EN, and reset signal RE. The enable signal EN is a signal for putting the PN code trade generation unit 152 in an operation state and the signal is generated in this embodiment when the power source is supplied to the output device 10 and the signal is supplied to the PN code sequence generation unit 152. Further, the reset signal RE is a signal, as described previously, for generating the PN code sequence having the predetermined code pattern from the top end thereof.

The PN code sequence generation unit 152 is enabled in accordance with the enable signal EN. Then, the PN code sequence generation unit 152 generates the PN code sequence PS based on the clock signal CLK on every supply of the reset signal RE and supplies this to the multiplication unit 155.

Figure 3:
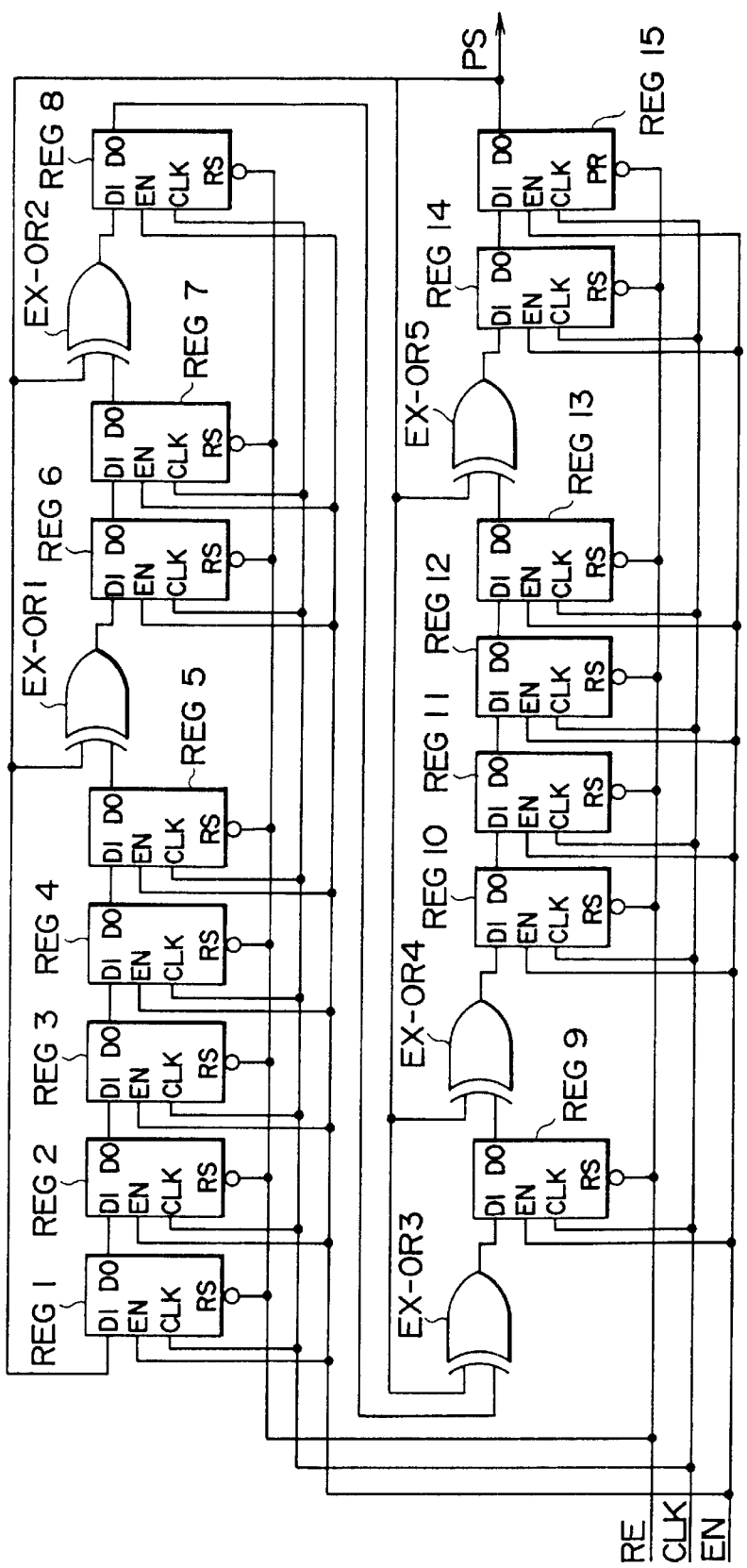
FIG. 3 is a block diagram for explaining an example of a PN code sequence generation unit of the SS anti-duplication control signal generation unit shown in FIG. 1

FIG. 3 is a view showing an example of the PN code sequence generation unit 152 shown in FIG. 2. The PN code sequence generation unit 152 in this embodiment comprises D flip-flops REG1–REG15 constituting a 15-step shift register, and EXCLUSIVE OR circuits EX-OR1–EX-OR5 for calculating optional tap output of the shift register. The PN code sequence generation unit 152 shown in FIG. 3 is adapted to generate a M series code based on the reset signal RE, the clock signal CLK and the enable signal EN as described above.

Then, in this embodiment, the PN code sequence generation unit 152 generates the M series code for generating codes "1" and "0" at random with no localization, and the thus generated code "0" is level-changed to code "−1" to generate PN code sequence PS comprising code "1" and code "−1".

A random number generation unit 153 generates a random number RD expressed, for example, by 2 bits on every optional timing and supplies this to the multiplication unit 155. The random number RD generated is used for changing the power level of the spectrally spread anti-duplication control signal at random as will be explained later.

The multiplication unit 155 generates a PN code sequence PD in which the level of the PN code sequence PS is changed at random by using the random number RD, and supplies this to the multiplication unit 154. In this embodiment the PN code sequence PS comprises code "1" and code "−1" as described above. Accordingly, it is adapted such that the code "1" is level changed in the positive direction and the code "−1" is level-changed in the negative direction by the random number RD.

The multiplication unit 155 spectrally spreading the anti-duplication control signal sequence FS by using the PN code sequence PD the level of which is changed at random. This forms a spectrally spread signal which is an anti-duplication control signal adapted to be level changed at random and spectrally spread (hereinafter referred to as SS anti-duplication control signal) and this is supplied to the DIA conversion circuit 192.

As described above in this embodiment, the PN code sequence PD is generated by changing the level of the PN code sequence generated at random by the PN code sequence generation unit 152 by using the random number RD, and the level of the anti-duplication control signal is changed at random by spectrally spreading the anti-duplication control signal by using the PN code sequence PD. For this end, the random number generation unit 153 described previously generates the random number RD at a rate capable of changing the level of the PN code sequence PS sufficiently quickly enough.

The D/A conversion circuit 192 converts the SS anti-duplication control signal S6 to the analog SS anti-duplication control signal S7 and supplies this to the addition unit 13. The addition unit 13 forms an analog video signal S8 superimposed with the analog SS anti-duplication control signal S7 and outputs the signal.

Then, the analog video signal S8 superimposed with the analog SS anti-duplication control signal S7 is supplied to a monitor receiver, for displaying a video image, a recording device for recording a video signal on a recording medium or the like.

In this case, as described previously, the SS anti-duplication control signal S7 superimposed on the video signal S8 is adapted such that the level is changed at random by using the random number RD. Therefore, it can not be recognized how the level of the SS anti-duplication control signal S7 is changed unless the random number RD used for changing the level of the SS anti-duplication control signal S7 is specified, so that the SS anti-duplication control signal S7 can not be eliminated from the video signal S8.

Namely, if a signal identical with the SS anti-duplication control signal S7 which is superimposed on the analog video signal S8 is generated and subtracted from the analog video signal S8, the SS anti-duplication control signal S7 can be eliminated. However, since it can not be recognized how the SS anti-duplication control signal S7 is changed, it is impossible to generate a signal for offsetting the SS anti-duplication control signal S7 superimposed on the analog video signal S8.

Accordingly, it is very difficult to eliminate the SS anti-duplication control signal S7 superimposed on the video signal, and thereafter it is likely the SS anti-duplication control signal S7 will be provided to the monitor receiver, the recording device and the like.

The random number may be generated, for example, by extracting noises generated in the output device 10 and using the extracting noises. In summary, any random number having no regularity and no reproducibility may be used as the random number for changing the level of the SS anti-duplication control signal at random.

Further, any random number expressed by 1 or more bits may be used for the random number RD to be generated which is not limited to the random number expressed by 2 bits as described above. For example, if the random number RD is 1 bit, the level of the SS anti-duplication control signal may be changed by a scaling factor of 0 or 1; or 0.5 or 1 corresponding to the value 01 of the random number RD expressed by 1 bit.

That is, if the random number RD comprises 1 bit, the level of the SS anti-duplication control signal S7 may be changed in accordance with 0, 1 as the value for the random number RD. It is not always limited to the case where the random number RD comprises 1 bit but the level of the SS anti-duplication control signal can also be changed by using other predetermined values in accordance with the value of the random number RD.

Next, explanations will be made to a recording device for recording information upon receiving the supply of an output signal from the output device 10 described above.

Figure 4:
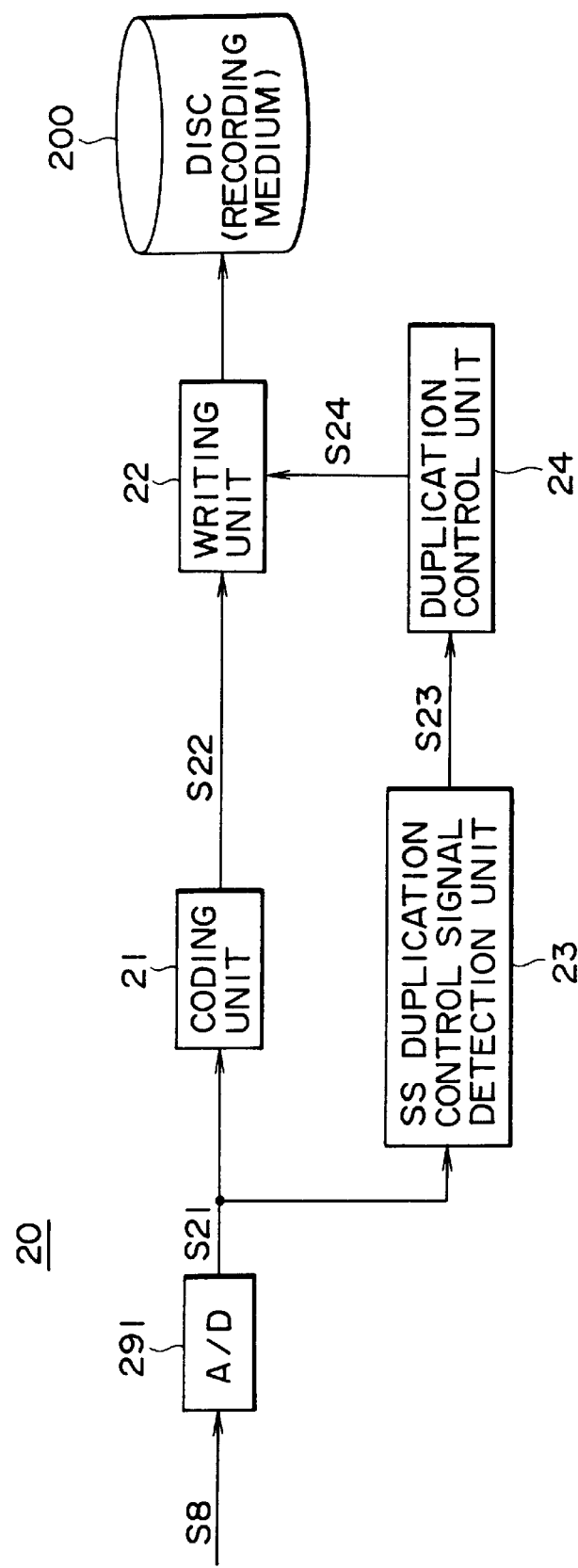
FIG. 4 is a block diagram for explaining the information recording device as an information anti-duplication device according to this invention.

FIG. 4 is a view for showing a recording device 20 used in the information anti-duplication system in this embodiment. That is, the recording device 20 corresponds to the recording system of a DVD device in this embodiment.

The recording device 20 in this embodiment comprises, as shown in FIG. 4, a coding unit 21, a writing unit 22, an SS anti-duplication control signal detection unit 23, a duplication control unit 24 for controlling the permission/prohibition of duplication and an A/D conversion circuit 291. Further, disc 200 is a DVD to which a video signal is written by the recording device 20.

The analog video signal S8 supplied from the output device 10 is put to A/D conversion by an A/D conversion circuit 291 and then supplied as a digital video signal S21 to the coding unit 21 and the SS anti-duplication control detection unit 23.

A The coding unit 21, receiving the digital video signal S21, generates a digital video signal S22 in which the video sync signal and is eliminated through coding treatment by for example, data compression of the digital video signal, and supplies the signal S22 to the writing unit 22.

The SS anti-duplication control signal detection unit 23 has a function as an inverse spectrally spreading means of conducting inverse spectral spread and taking out the anti-duplication control signal superimposed on the digital video signal S21.

Figure 5:
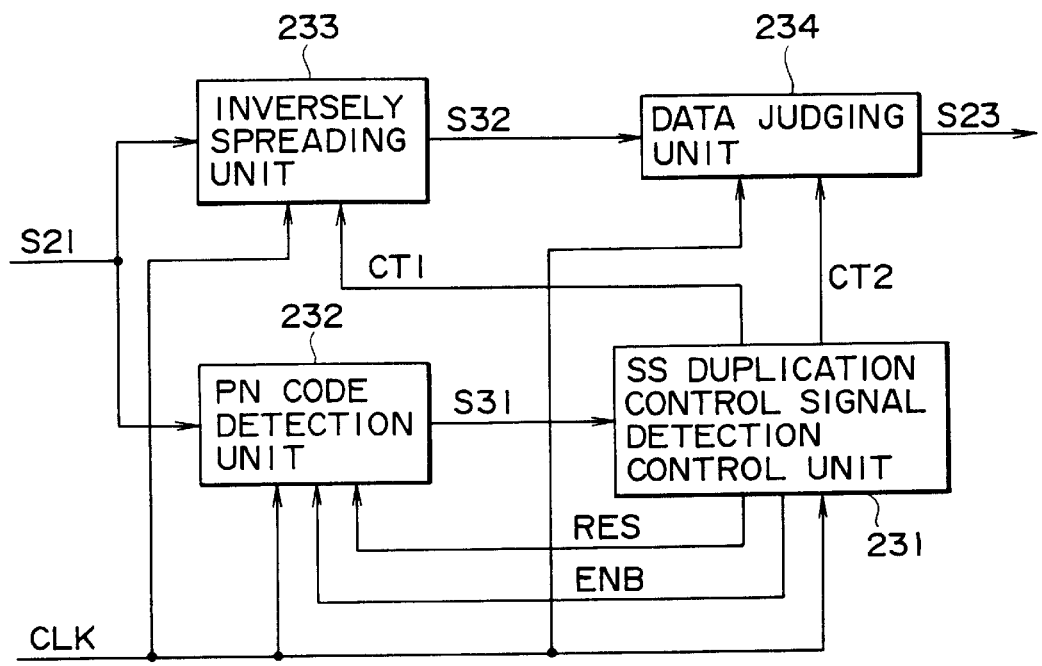
FIG. 5 is a view for explaining SS anti-duplication control signal detection unit of the information recording device shown in FIG. 5

FIG. 5 is a block diagram for explaining the constitution of the SS anti-duplication control signal detection unit 23 of the recording device 20 in this embodiment. As shown in FIG. 5, the SS anti-duplication control signal detection unit 23 in this embodiment comprises an SS anti-duplication control signal detection control unit 231, a PN code detection unit 232 for detecting the PN code of spectrally spreading the anti-duplication control signal, an inversely spreading unit 233 for taking out the spectrally spread anti-duplication control signal from the supplied digital signal S21, and a data judging unit 234 for restoring the anti-duplication control signal taken out by the inversely spreading unit 233 into the original anti-duplication control signal.

As shown in FIG. 5, the SS anti-duplication control signal detection control unit 231 generates enable signal ENB and reset signal RE upon receiving the clock signal CLK synchronized with the digital video signal, supplies them to the PN coding unit 232 to control the detection of the PN code spectrally spreading the anti-duplication control signal.

The PN code detection unit 232 is formed, for example, by using a sliding correlator. The PN code detection unit 232 is enabled to operate by the enable signal ENB. Then, it generates a PN code sequence everytime the reset signal RES, based on the clock signal CLK.

The PN code detection unit 232 detects the PN code sequence spectrally spreading the anti-duplication control signal by determining the correlation between the generated PN code sequence and the PN code sequence spectrally spreading the anti-duplication control signal.

The PN code detection unit 232 supplies, to the signal detection control unit 231, signal S31 that indicates the result of the determination for the correlation between the PN code sequence generated in the PN code detection unit 232 and the PN code sequence spectrally spreading the anti-duplication control signal. As the result of the determination for the correlation between the PN code sequence generated by the PN code detection unit 232 and the PN code sequence spectrally spreading the anti-duplication control signal, the signal S31 becomes a high level signal if the correlation is high and becomes a low level signal if the correlation is low.

When the signal S31 indicating the result of the determination for the correlation is received from the PN code detection unit 232 and if the signal is higher than a predetermined level, the SS anti-duplication control signal detection control unit 231 judges that the PN code sequence spectrally spreading the anti-duplication control signal and the PN code sequence generated by the PN code detection unit 232 are in a synchronized state and the PN code sequence spectrally spreading the anti-duplication control signal is detected. On the contrary, if the signal from the PN code detection unit 232 is lower than the predetermined level, the control unit judges that the PN code sequence spectrally spreading the anti-duplication control signal and the PN code sequence generated by the PN code detection unit are not synchronized.

Then, if the PN code sequence spectrally spreading the anti-duplication control signal is not detected in the PN code detection unit 232, the phase of the PN code sequence generated by the PN code detection unit 232 is adjusted and the detection for the PN code sequence is repeated.

Further, if the PN code sequence spectrally spreading the anti-duplication signal is detected in the PN code detection unit 232, the SS anti-duplication control signal detection control unit 231 generates signal CT1 for controlling the starting timing for the generation of the PN code sequence in the inversely spreading unit 233 in accordance with the result of the detection of the PN code detection unit 232, and supplies the signal, CT1 to the inversely spreading unit 233. Further, the SS anti-duplication control signal detection control unit 231 generates signal CT2 for controlling the data judging unit 234 and supplies the signal the data judging unit 234.

The inversely spreading unit 233 has a PN code generation unit and a multiplication unit circuit although not illustrated. Then, the unit, 233 generates a PN code sequence in accordance with the clock signal CLK on every timing shown by the signal CT1 from the SS anti-duplication control signal, which has been detection control unit 231. Then, the unit conducts inverse spectral spread by using the generated PN code sequence, takes out the anti-duplication control signal converted into a broad band and low level signal, as an original narrow band and high level signal and supplies the signal S32 to the data judging unit 234.

The data judging unit 234 restores the taken out anti-duplication control signal S23 and supplies the signal to the duplication control unit 24. That is, the data judging unit 234 judges the content of the duplication control indicated by the anti-duplication control signal S23 and informs the same to the duplication control unit 24.

The same PN code generator shown in FIG. 3 used in the SS anti-duplication control signal generation unit 16 of the output device 10 described previously is used for the PN code generator for generating the PN code sequence in the PN code detection unit 232 and the inversely spreading unit 233 of the SS anti-duplication control signal detection unit 23 shown in FIG. 5.

The duplication control unit 24 generates a control signal S24 for controlling the writing unit 22 based on the result of the judgment from the judging unit 234 and supplies the signal to the writing unit 22. The control signal S24 controls the permission or prohibition of writing of the video signal S22 to the disc 200.

The writing unit 22 writes the digital video signal S22 into the disc 200 if the control signal S24 from the duplication control unit 24 permits duplication, whereas it does not write the digital video signal S22 into the disc 200 if the control signal S24 prohibits duplication.

Also in the recording device 20 of this embodiment, the SS anti-duplication control signal superimposed on the video signal S21 supplied to the SS anti-duplication control signal detection unit 23 is adapted such that the level is changed at random. However, while the level changes at random the code pattern or series of the PN code sequence spectrally spreading the SS anti-duplication control signal is not changed.

Accordingly, in the inverse spectral spread in the inversely spreading unit 233 of the 55 anti-duplication control signal detection unit 23, there is no significant effect on the change of the level of the SS anti-duplication control signal, and the anti-duplication control signal superimposed on the video signal 28 can be detected by conducting the inverse spectral spread by using the same PN code sequence as the PN code sequence PS before the random level change.

The recording device 20 in this embodiment can detect the anti-duplication control signal superimposed on the video signal by the inverse spectral spread and can conduct anti-duplication control of the supplied video signal in accordance with the detected anti-duplication control signal.

Further, as described previously, it is not necessary to distinguish the random number from the random number RD used in the output device 10 or reproduce the same in the recording device 20. As can be seen from this, an optional random number can be used for the random number RD used in the output device 10.

Further, since it is not necessary to reproduce the random number RD used, various random numbers can be used also in the output device 10.

[Modified Embodiment of SS Anti-duplication Control Signal Generation Unit 15 of the Output Device 10]

Figure 6:
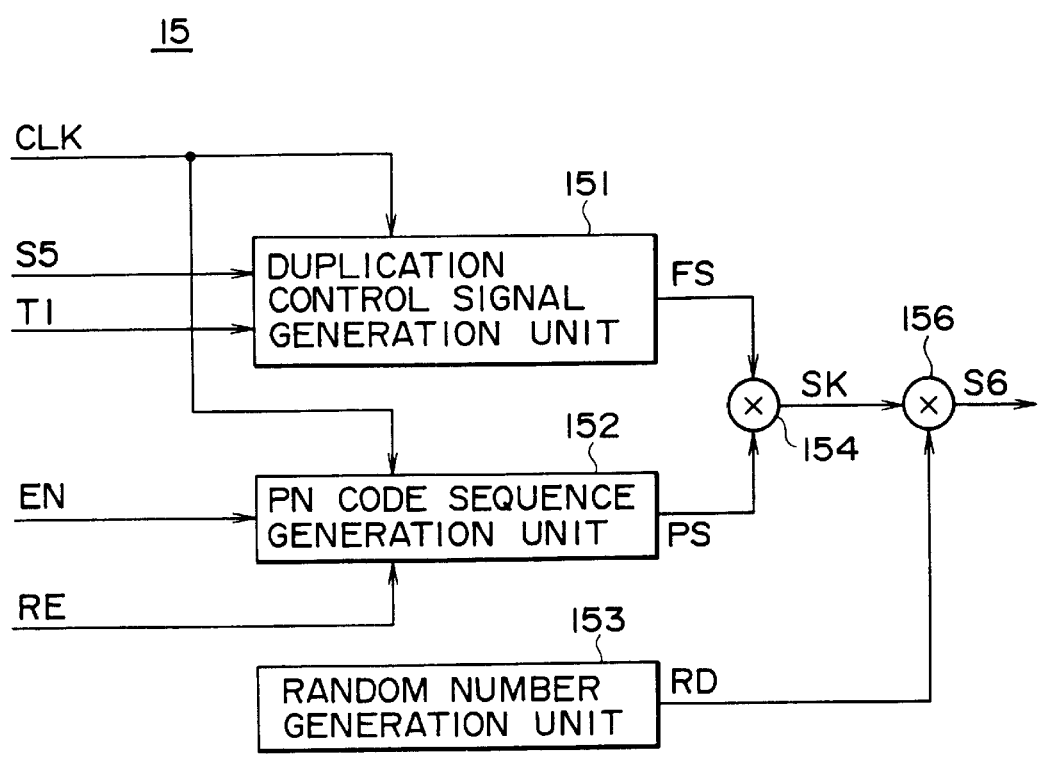
FIG. 6 is a block diagram for explaining another example of the SS anti-duplication control signal generation unit of the information output device as the information anti-duplication device.

In the previous embodiment, it has been explained that the SS anti-duplication control signal generation unit 15 has a constitution shown in FIG. 2, but it is not restricted thereto. For instance, a multiplication unit 156 may be disposed to the succeeding stage of the multiplication unit 154 as shown in FIG. 6 instead of the multiplication unit 155 shown in FIG. 2. In FIG. 6, each of the units other than the multiplication unit 156 is identical with each of the corresponding units in the SS anti-duplication control signal generation unit 15 shown in FIG. 2.

In this case, anti-duplication control signal sequence FS is spectrally spread by the PN code sequence PS in the multiplication unit 154 to generate SS anti-duplication control signal SK. Then, the SS anti-duplication control signal SK and the random number RD from the random number generation unit 153 are supplied to the multiplication unit 156. In the multiplication unit 156, the level of the SS anti-duplication control signal SK is changed at random by the random number RD, to generate, SS anti-duplication control signal S6.

As described above, the level of the spectrally spread anti-duplication control signal SK may be changed at random by using the random number RD.

Further, the random number RD may be multiplied to the anti-duplication control signal sequence FS generated by the anti-duplication control signal sequence generation unit 151.

Further, it may be adapted also such that the level of the SS anti-duplication control signal is not changed in the SS anti-duplication control signal generation unit 15 of the output device 10, but the SS anti-duplication control signal is put to D/A conversion by the D/A conversion circuit 192 shown in FIG. 1 and then the level of the analog SS anti-duplication control signal S7 may be changed at random by using the random number RD.

The random number generation unit 153 shown in FIG. 6 is identical with the random number generation unit 153 shown in FIG. 2, which generates a random number with no regularity and no reproducibility.

[Second Embodiment]

Figure 7:
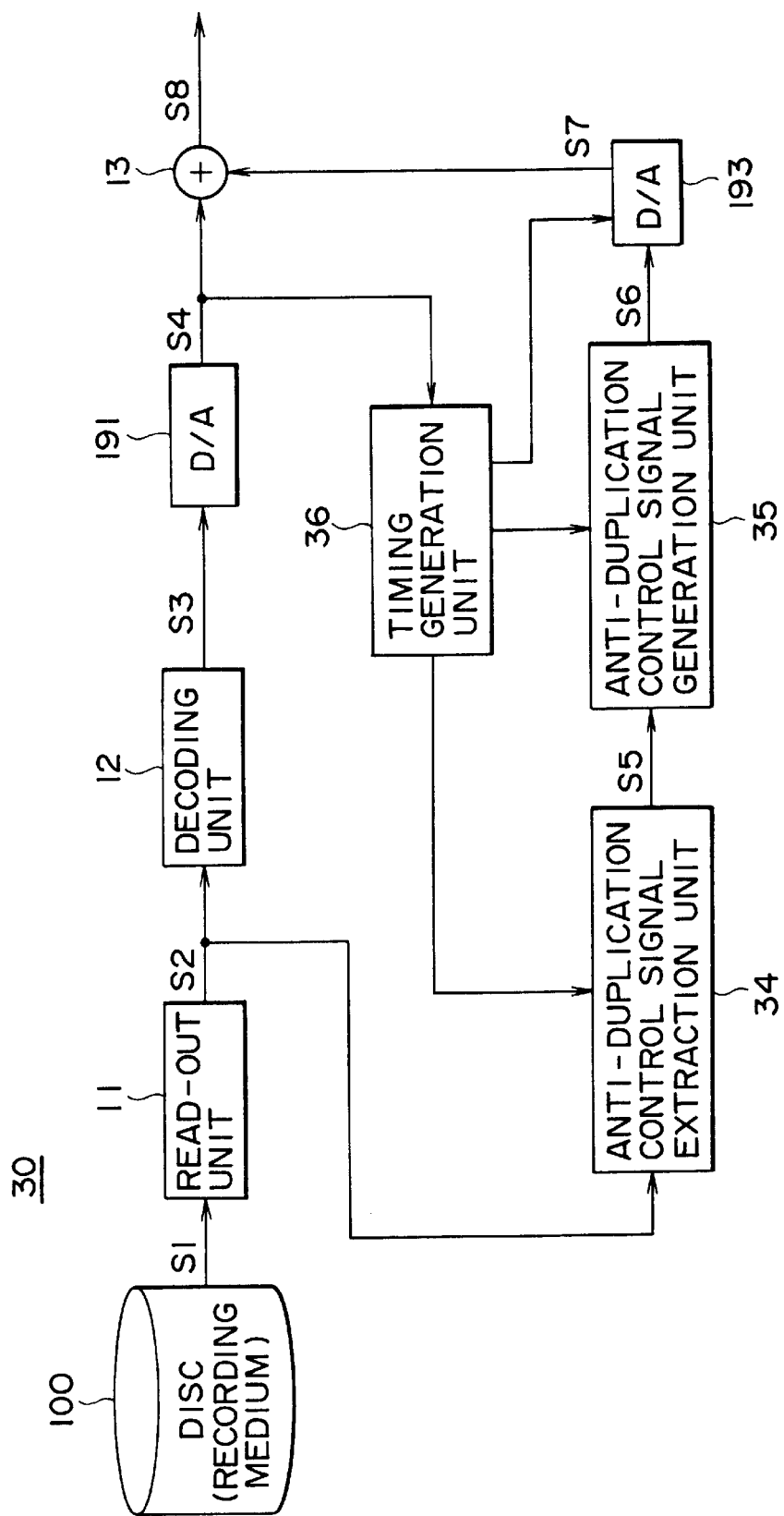
FIG. 7 is a block diagram for explaining another embodiment of the information output device as the information anti-duplication device according to this invention.

FIG. 7 is a view for explaining an output device 30 of the second embodiment. The output device 30 corresponds to a playback system of a DVD device like the output device 10 in the first embodiment described previously.

Further, as shown in FIG. 7, each of the units of the output device 30 in the second embodiment is identical with corresponding units of the output device 10 in the first embodiment described previously, including the disc 100, except for an anti-duplication control signal extraction unit 34, an SS anti-duplication control signal generation unit 35, a timing generation unit 36 and a D/A conversion circuit 193.

Then, the anti-duplication control signal extraction unit 34, the anti-duplication control signal generation unit 35 and the D/A conversion circuit 193 of the output device 30 have the same functions as those of the anti-duplication signal extraction unit 14, the anti-duplication signal generation unit 15 and the D/A conversion circuit 192 of the output device 10 previously described referring to FIG. 1, but they are different from the corresponding units of the output device 10 shown in FIG. 1 in that they operate upon receiving timing signal from the timing generation unit 36.

In the output device 30 of the second embodiment, the timing generation unit 36 receives analog video signal and generates a clock signal or various possible kinds of timing signals using the video sync signal in the analog video signal S4 as a reference signal.

Figure 8:
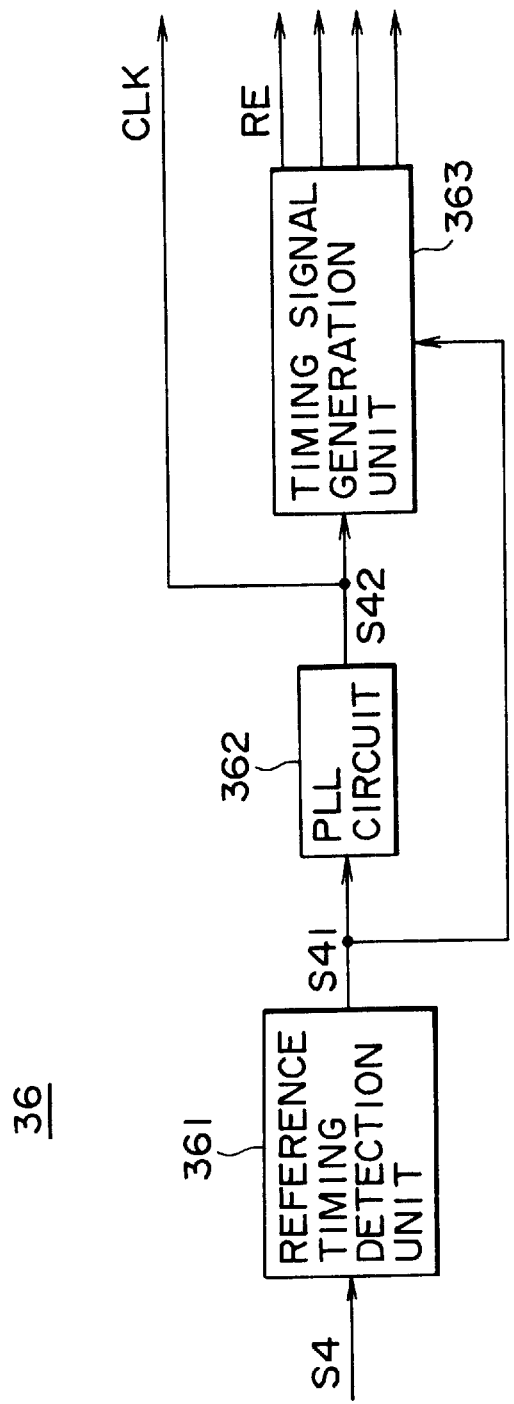
FIG. 8 is a block diagram for explaining the timing generation unit of the information output device shown in FIG. 7.

FIG. 8 is a block diagram for explaining the timing generation unit 36. As shown in FIG. 8, the timing generation unit 36 comprises a reference timing detection unit 361, a PLL circuit 362 and a timing signal generation unit 363.

The reference timing detection unit 361 extracts the video sync signal as a reference timing signal from the supplied analog video signal S4. In this embodiment, since the vertical sync signal is used as the reference timing signal, the reference timing detection unit 361 extracts vertical sync signal S41 and supplies the signal to the PLL circuit 362 and the timing signal generation unit 363.

The PLL circuit 362 generates clock signal CLK1 that is synchronized with the vertical sync signal S41 and supplies the signal to each of the processing units such as timing signal generation unit 363, the anti-duplication control signal extraction unit 34, the anti-duplication control signal generation unit 35 and the D/A conversion circuit 193.

The timing signal generation unit 363 generates and outputs reset signal RE1 and various kinds of timing signals based on the vertical sync signal S41 and the clock signal CLK1. In this second embodiment, the reset signal RE1 is synchronized with the vertical sync signal and has 1 vertical interval as 1 period.

The anti-duplication control signal extraction unit 34 extracts the anti-duplication control signal S5 from the information data sequence of the playback video signal component S2 and supplies the extracted signal to the SS anti-duplication control signal generation unit 35.

The SS anti-duplication control signal generation unit 35 has a function as a spectrally spreading means and generates SS anti-duplication control signal S6 by spectrally spreading the anti-duplication control signal S5.

In the second embodiment, the SS anti-duplication control signal generation unit 35 has the same constitution as the SS anti-duplication control signal generation unit 15 described previously with reference to FIG. 2. Therefore, the SS anti-duplication control signal generation unit 35 will be explained below as having the constitution shown in FIG. 2.

To the SS anti-duplication control signal generation unit 35 in the second embodiment, the reset signal RE1 and the clock signal CLK1 generated by the timing generation unit 36 are supplied as the signals corresponding to the reset signal RE and the clock signal CLK used in the SS anti-duplication control signal generation unit 15 of the first embodiment.

Figure 9:
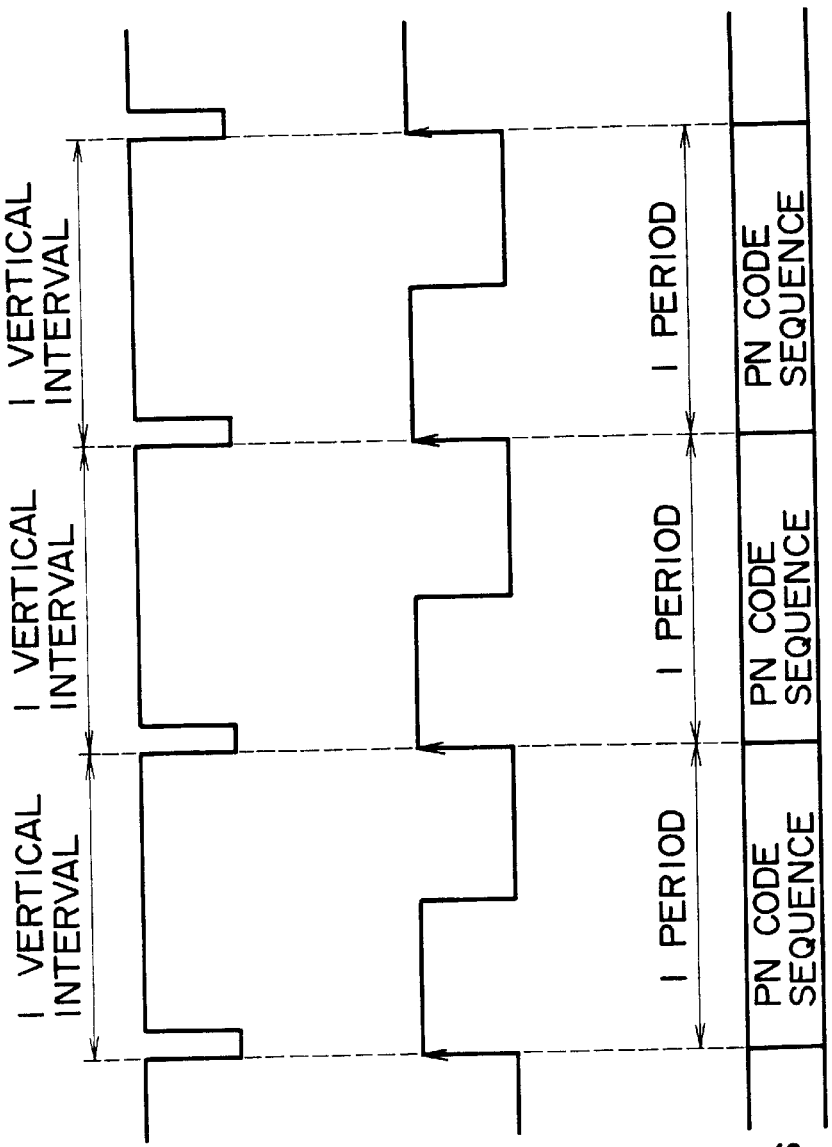
FIG. 9 is a view for explaining the PN code sequence which is generated is synchronized with the vertical sync signal in the information output device.

With the constitution described above, the PN code sequence generation unit 152 of the SS anti-duplication control signal generation unit 35 generates, as shown in FIG. 9 using the vertical sync signal (FIG. 9A) as a reference signal and based on reset signal RE1 having 1 vertical interval as 1 period (FIG. 9B) and clock signal CLK1 synchronized with the vertical sync signal, the PN code sequence PS (FIG. 9C) on every 1 vertical interval for 1 period from the top end thereof.

The PN code sequence PD is generated by changing the level of the PN code sequence PS on every 1 vertical interval at random by the random number RD from the random number generation unit 153. When the anti-duplication control signal sequence FS is spectrally spread by using the PN code sequence PD, SS anti-duplication control signal S6 changed at random for the level is generated by spectrally spreading the anti-duplication control signal sequence FS using the PN code sequence PD.

As described above, the output device 30 of the second embodiment generates the spreading PN code sequence PS used for spectral spread on every 1 vertical interval. Then, the anti-duplication control signal S6 changed at random for the level is generated by using the PN code sequence PS generated on every 1 vertical interval and the random number RD.

Then, the generated SS anti-duplication control signal S6 is put to D/A conversion like that in the output device 10 of the first embodiment described previously to generate the analog SS anti-duplication control signal S7, which is superimposed on the analog video signal S4 to form the output video signal S8, which is supplied to a monitor receiver or a recording device.

As described above, in the output device 30 of the second embodiment, the anti-duplication control signal S6 is generated by spectrally spreading the anti-duplication control signal using the PN code sequence generated on every 1 vertical interval, and the level of the SS anti-duplication control signal S6 is changed at random by using the random number RD.

Accordingly, also in the output device 30 of the second embodiment, it is difficult to follow after the change of the level of the SS anti-duplication control signal S6 and it is extremely difficult to eliminate the SS anti-duplication control signal superimposed on the video signal from the video signal.

Further, the PN code sequence used for spectral spread is generated on every 1 vertical interval as described above. This allow inverse spectral spread to be conducted rapidly and exactly as will be detailed later.

In the output device 30 of the second embodiment, the SS anti-duplication control signal generation unit 35 is not restricted to the constitution described previously with reference to FIG. 2 but the anti-duplication control signal generation unit of the constitution described previously with reference to FIG. 6 may also be used.

Next, description will be made to a recording device for receiving the output signal from the output device 30 described above and recording the information.

Figure 10:
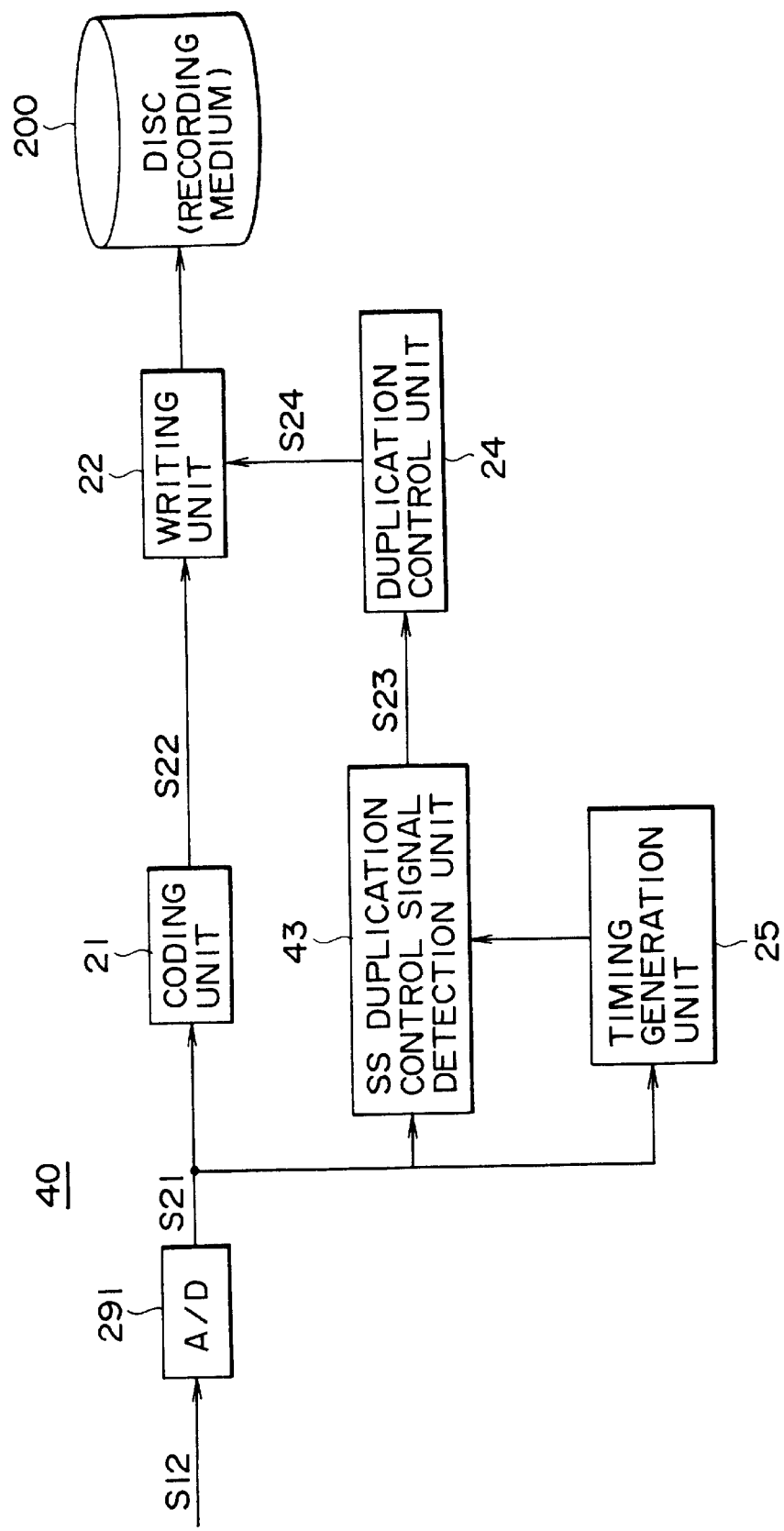
FIG. 10 is a block diagram for explaining another embodiment of the information recording device as an information anti-duplication device according to this invention and FIG. 11 is a block diagram for explaining another embodiment of the information recording device as an information anti-duplication device according to this invention.

FIG. 10 is a view for explaining the recording device 40 used in the system for prohibiting information duplication in the second embodiment. That is, the recording device 40 in this embodiment corresponds to a recording system of a DVD device.

The recording device 40 in this embodiment, as shown in FIG. 10, has the same constitution as the corresponding units in the recording device 20 of the first embodiment described previously including the disc 200, except for an SS anti-duplication control signal detection unit 43 and a timing generation unit 25.

As described previously, in the output device 30 of the second embodiment, the PN code sequence PS is generated in synchronization with the vertical sync signal in the video signal and based on the reset signal RE1 having 1 vertical interval as 1 period, and the anti-duplication control signal sequence FS is spectrally spread by using the PN code sequence in which the level of the PN code sequence PS is changed at random.

Accordingly, also in the recording device 40, the inversely spreading PN code sequence for inverse spread can be generated easily at the same timing as the PN code sequence PS for spread, by generating the PN code sequence for inverse spread used for the inverse spectral spread on every 1 vertical interval, based on the vertical sync signal in the video signal supplied from the output device 30.

In the recording device 40 of the second embodiment, a reset signal for controlling the starting time for the generation of the PN code sequence for inverse spread is generated by the timing generation unit 25, and the reset signal is supplied to the SS anti-duplication control signal detection unit 43.

The timing generation unit 25 of the recording device 40 is constituted in the same manner as the timing generation unit 34 of the output device 30 described previously with reference to FIG. 8, and the unit 25 generates a reset signal for controlling the starting time of the generation of the inversely spreading PN code sequence and a clock signal synchronized with the vertical sync signal and supplies them to the SS anti-duplication control signal detection unit 43.

In this case, the reset signal obtained from the timing generation unit 25 is a signal corresponding to the reset signal RE1 used in the SS anti-duplication control signal generation unit 36 of the output device 30, which is a vertical period signal. Accordingly, the reset signal obtained from the timing generation unit 25 is a signal synchronized with the reset signal RE1 and can be used as a signal for the generation of the inversely spreading PN code sequence from the top end thereof.

The SS anti-duplication control signal detection unit 43 generates the PN code sequence based on the timing signal including the reset signal from the timing generation unit 24 and conducts inverse spectral spread as described previously, restores the anti-duplication control signal superimposed on the digital video signal S21 from the A/D conversion circuit 291 and supplies the same to the duplication control unit 24.

As described above, the recording unit 40 of the second embodiment conducts spectral spread and inverse spectral spread using the PN code of the vertical period. Accordingly, since the recording unit 40 can easily generate the PN code sequence by generating the reset signal synchronized with the vertical sync signal, the inverse spectral spread can be conducted rapidly and the anti-duplication control signal superimposed on the spectrally spread video signal can be detected rapidly.

Further, in the same manner as in the first embodiment, the SS anti-duplication control signal which is spectrally spread and in which the level is changed at random is superimposed on the video signal supplied from the output device 30. Therefore, it is possible in the recording device 40 to detect the anti-duplication control signal which is spectrally spread, changed at random for the level and superimposed on the video signal and conduct anti-duplication control to the supplied video signal based on the detected anti-duplication control signal, but it is extremely difficult to eliminate the superimposed anti-duplication control signal from the video signal.

It is of course difficult, also in the course of transmitting the video signal from the output device 30 to the recording device 40, to eliminate the SS anti-duplication control signal superimposed on the video signal.

In the output device 30 described previously with reference to FIG. 7, it is explained that the timing generation unit 36 receives the supply of the analog video signal S4 after D/A conversion, extracts the vertical sync signal as the reference signal and generates various kinds of timing signals but the unit may also be constituted such that it receives the supply of the digital video signal S3 before D/A conversion, extracts the vertical sync signal as the reference signal from the digital video signal S3 and generates various kinds of timing signals and the clock signal.

Further, in the recording device 40 previously described with reference to FIG. 10, the timing generation unit 25 is adapted such that it receives the supply of the digital video signal S21 after A/D conversion and generates various kinds of timing signals, but it may be also adapted such that it receives the supply of the analog video signal S8 before A/D conversion, extracts the vertical sync signal as the reference signal from the analog video signal S8 and generates the timing signal S25 and the clock signal CLK1.

As described previously, the spreading and inversely spreading PN code sequence can be regenerated not only on every 1 vertical interval but also generated on every plurality of vertical intervals such as on every 2 vertical intervals or on every 4 vertical interval. Alternatively, they may be generated on every 1 divisional interval or on every plurality of divisional intervals by dividing 1 vertical interval into a plurality of divisions, such as on every ½ vertical interval or ¼ vertical interval.

Further, the video sync signal is not restricted only to the vertical sync signal but the horizontal sync signal may also be used. Also in this case, the spreading and inversely spreading PN code sequences may be generated on every plurality of horizontal intervals or may be generated on every 1 divisional interval or on every plurality of divisional intervals by dividing the horizontal interval into a plurality of divisions.

Further, while M series PN code is used in the previous embodiment, it is not restricted only thereto and various kinds of spreading codes such as those of Gold code series may also be used.

[Third Embodiment]

Further, spectrally spread anti-duplication control signal may be superimposed on the video signal with no addition of information for anti-duplication control and can be recorded on the recording medium. In this case, if the spectrally spread anti-duplication control signal is changed at random at the level, superposed on the video signal and recorded in the recording medium, an effective anti-duplication control is possible since the anti-duplication control signal can not be eliminated easily.

Figure 11:
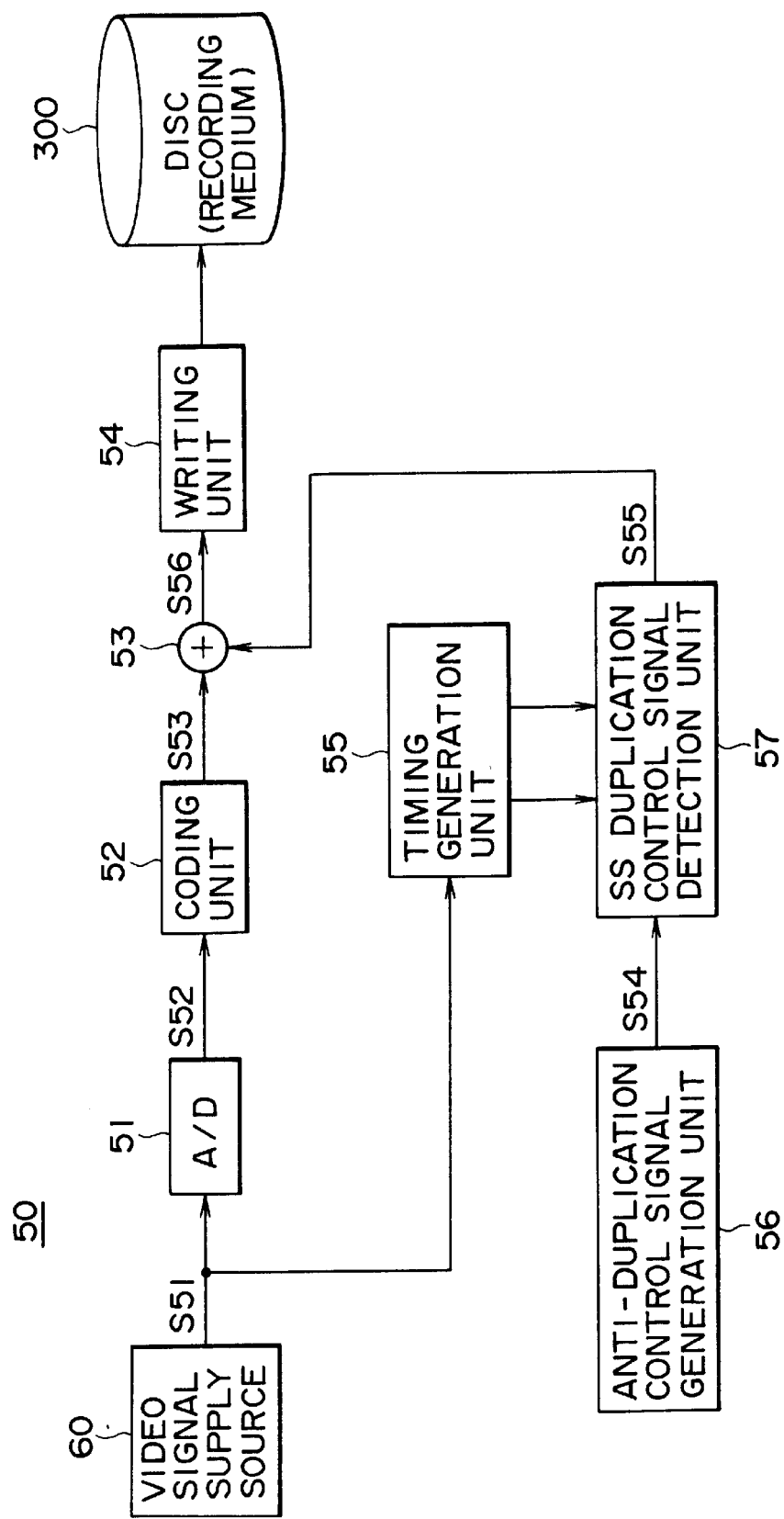

FIG. 11 is a view for explaining an example of a recording device for recording video signals as the information signal to a recording medium.

A recording device 50 shown in FIG. 11 receives supply of analog video signal S51 from a supply source 60 of a video signal, for example, a playback device or a receiving device for a video signal or a video camera, and supplies the signal to an A/D conversion circuit 51 and a timing generation unit 55.

The A/D conversion circuit 51 converts an analog video signal S51 into a digital video signal S52 and supplies the signal to a coding unit 52. The coding unit 52 generates digital video signal S53 in the same manner as the coding unit 21 of the recording device 20 described previously and supplies the signal to the addition unit 53.

The timing generation unit 55 is identical with the timing generation unit 25 of the recording device 20 described previously, and generates various kinds of timing signals and clock signal based on the video sync signal contained in the analog video signal S51, and supplies them to the SS anti-duplication control signal generation unit 57.

The anti-duplication control signal generation unit 56 generates anti-duplication control signal S54 to be superimposed on the video signal recorded in the disc 300 and supplies the signal S54 to the SS anti-duplication control signal generation unit 57.

The SS anti-duplication control signal generation unit 57 is constituted in the same manner as the SS anti-duplication control signal generation unit 15 of the output device 10 previously described with reference to FIG. 2. The unit spectrally spreads the anti-duplication control signal S54, changes the power level thereof at random by using a random number to generate SS anti-duplication control signal S55 and supplies the signal to the addition unit 53.

The addition unit 53 adds the SS anti-duplication control signal S55 to the digital video signal S53 and supplies the same to the writing unit 54. The writing unit 54 records the supplied digital video signal S56 to the disc 300. Thus, it is possible to prepare a recording medium recording therein a video signal superimposed with the anti-duplication control signal which is spectrally spread and changed at random for the level.

In a case of the recording medium having the video signal recorded therein previously superimposed with the anti-duplication control signal which is spectrally spread and changed at random for the level, the output device has no requirement, for example for, taking out the anti-duplication control signal, spectral spread, level change, change of the spectrally spread anti-duplication control signal superimposed on the video signal as in the case of the output device 10 described previously. That is, in a playback device of playing back the recording medium, a video signal superimposed with the anti-duplication control signal which is spectrally spread and changed at random for the level is played back by applying the playing back treatment for the video signal from the recording medium.

In the recording device 20 in this case, inverse spectral spread is conducted by using the PN code sequence having identical timing with that of the PN code sequence used for spectrally spreading the anti-duplication control signal superimposed on the video signal previously recorded in the recording medium as described above, by which it is possible to detect the anti-duplication control signal which is spectrally spread and superimposed on the video signal and to conduct anti-duplication control based on the detected anti-duplication control signal.

In the embodiment described above, the output device 10, 30 and the recording device 20, 40 are explained as a DVD device but they are not restricted only thereto. For instance, this invention is applicable also to the playback device or the recording device for a video disc or video DVD. That is, this invention is applicable to any the analog equipments such as analog VTR and digital equipments such as DVD device.

Further, in the previous embodiment, while the anti-duplication control device is explained in a case of the DVD playback device or recording device, it not restricted only to the playback device or recording device. For example, this invention is also applicable to a case of applying the information output device to the output device for a television signal at a broadcasting station, and transmitting the television signal while superimposing the spectrally spread anti-duplication control signal to the television signal to be transmitted. Then, the receiving side can take-out the anti-duplication control signal sequence superimposed on the video signal by conducting inverse spectral spread and conduct anti-duplication control for the video signal based on the anti-duplication control signal.

This invention is of course applicable to the video output or receiving device in a case of transmitting analog video signals by way of a cable as in a cable television.

Further, in the embodiment described previously, the information signal to be transmitted has been explained for a video signal but the signal is not restricted only to the video signal. For example, this invention is applicable also to a case of transmitting, for example, audio signals or data.

As has been described above, according to the information transmission method, the information duplication prohibiting method, the information duplication prohibiting device, and the information recording medium of this invention, the level of the anti-duplication control signal to be superimposed on the image signal can be changed at random by using a random number. This makes it extremely difficult to remove the anti-duplication control signal which is spectrally spread and superimposed on the information signal from the information signal in the course of the transmission or at the destination of the transmission of the information signal. Accordingly, since the anti-duplication control signal can be supplied reliably to the destination of the transmission, the anti-duplication control for the information signal can be conducted reliably based on the anti-duplication control signal.

What is claimed is:

1. An information embedding method comprising the steps of:
generating embedded information having a randomly changing signal power level using additional information; and
embedding said embedded information in a signal, wherein said generating step comprises the steps of:
generating a code representing a signal polarity;
generating a random number representing a signal magnitude;
changing a signal level of said code by a predetermined degree corresponding to said random number and producing a signal level modified code; and
modifying said additional information using said signal level modified code and outputting said embedded information.

2. The information embedding method as defined in claim 1, wherein said additional information is a duplication control information representing one of a prohibition of duplication of said signal and a permission of duplication of said signal.

3. An information embedding device comprising:
a first random number generator;
a second random number generator;
a first multiplier having input thereto a first random number outputted from said first random number generator and a second random number outputted from said second random number generator;
a second multiplier having input thereto an additional code and an output from said first multiplier; and
a combiner for combining a signal and an output from said second multiplier and outputting an additional code embedded signal,
wherein one of said first random number and said second random number represents one of a signal polarity and a signal magnitude.

4. An information embedding device comprising:
a first random number generator;
a second random number generator;
a first multiplier having input thereto a first random number outputted from said first random number generator and an additional code;
a second multiplier having input thereto a second random number outputted from said second random number generator and an output from said first multiplier; and
a combiner inputting a signal and an output from said second multiplier and outputting an additional code embedded signal,
wherein one of said first random number and said second random number represents one of a signal polarity and a signal magnitude.

5. An information embedding device comprising:
a generator for generating embedded information having a randomly changing signal level using additional information; and
an embeddor for embedding said embedded information in a signal,
wherein said generator further comprises:
a code generator for generating a code representing a signal polarity;
a random number generator for generating a random number representing a signal magnitude;
a signal level modifier for modifying a signal level of said code by a predetermined degree corresponding to said random number and producing a signal level modified code; and
an information modifier for modifying said additional information using said signal level modified code, and for outputting said embedded information.

6. The information embedding device as defined in claim 5, wherein said code is a spread code for spreading said additional information, and said information modifier spreads said additional information using said signal level modified code.

7. The information embedding device as defined in claim 6, wherein said information modifier spreads said additional information according to a spread spectrum process.

8. The information embedding device as defined in claim 5, wherein said code is a random number.

9. The information embedding device as defined in claim 6, wherein said spread code is a pseudo-random noise code.

10. The information embedding device as defined in claim 5, wherein said additional information is a duplication control information representing one of a prohibition of duplication of said signal and a permission of duplication of said signal.

11. An information method comprising the steps of:
generating embedded information having a randomly changing signal power level using additional information; and
embedding said embedded information in a signal, wherein said generating step comprises the steps of:
generating a code representing a signal polarity;
generating a random number representing a signal magnitude;

generating embedded information having a randomly changing signal power level using said additional information, said code, and said random number.

12. An information embedding method comprising the steps of:

generating embedded information having a randomly changing signal level using auxiliary information having a first symbol and a second symbol; and embedding said embedded information in a signal, wherein said generating step comprises the steps of:

generating a random number representing a signal magnitude;

generating embedded information having a randomly changing signal level by modifying signal level of said first symbol of said additional information in a positive direction using said random number and by modifying a signal level of said second symbol of said additional information in a negative direction using said random number.

13. An information embedding device comprising:

a generator for generating embedded information having a randomly changing signal power level using additional information; and a signal embedding device for embedding said embedded information in a signal, wherein said generator includes:

a code generator for generating a code representing a signal polarity;

a random number generator for generating a random number representing a signal magnitude;

a combiner for generating embedded information having a randomly changing signal power level using said additional information, said code, and said random number.

14. An information embedding device comprising:

a generator for generating embedded information having a randomly changing signal level using auxiliary information having a first symbol and a second symbol; and a signal embedding device for embedding said embedded information in a signal, wherein said generator includes:

a random number generator for generating a random umber representing a signal magnitude;

a combiner for generating embedded information having a randomly changing signal level by modifying a signal level of said first symbol of said additional information in a positive direction using said random number and by modifying a signal level of said second symbol of said additional information in a negative direction using said random number.

* * * * *